March 18, 1930.  A. I. MARCUM  1,750,899
DRIVE AXLE
Filed June 7, 1926  2 Sheets-Sheet 1

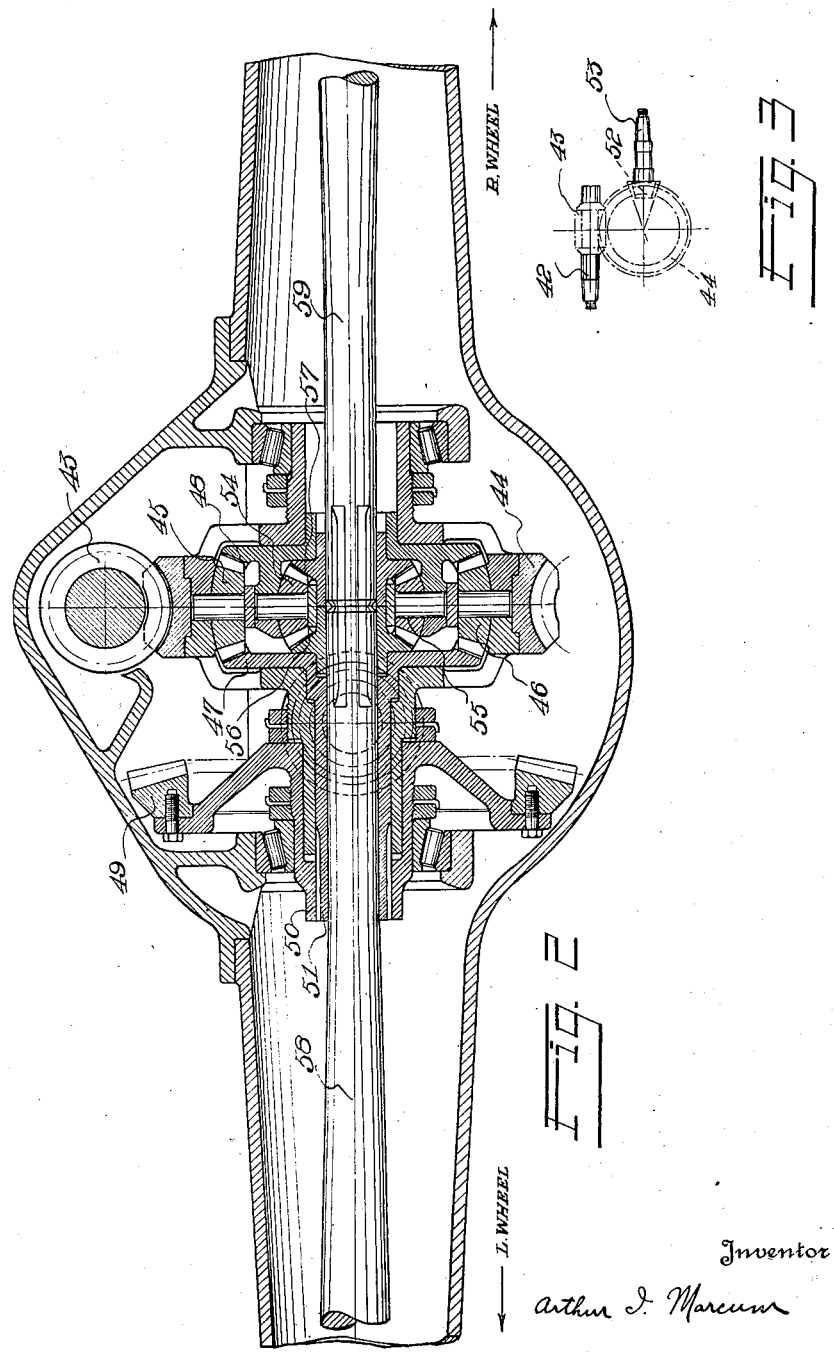

Patented Mar. 18, 1930

1,750,899

UNITED STATES PATENT OFFICE

ARTHUR I. MARCUM, OF OAKLAND, CALIFORNIA, ASSIGNOR TO EMORY WINSHIP, OF MACON, GEORGIA

DRIVE AXLE

Application filed June 7, 1926. Serial No. 114,251.

This invention relates to drive axles for multiple wheel vehicles that include a plurality of driven shafts carrying wheels, each of which is capable of differential movement with respect to its companion on the same shaft and with respect to the driven wheels on the parallel shaft. In constructions of this type it has been before proposed to employ three differentials to effect the result just stated.

It is the primary object of this invention to provide a construction of the type just referred to which is extremely compact to the end that the floor of the body of the vehicle may be brought as low as practicable, thus lowering the center of gravity of the vehicle permitting it to be driven at comparatively high speed with little danger of upsetting.

It is a further object of the invention to provide a construction in which standard and interchangeable parts may be used, that is, the construction is designed with a view to minimize the use of parts of special design.

It is a further object of the invention to provide a construction in which two of the differentials are arranged in nested relation and in which all of the gears turn on axes that lie normally in the same horizontal plane.

A still further object of the invention is to provide a worm gear drive that is adapted for use in constructions such as above described.

Further objects of the invention will appear as the description proceeds with reference to the accompanying drawings, in which, Figure 1 is a horizontal sectional view of the preferred form of my improved drive axle.

Figure 2 is a vertical section of a modified form of invention embodying a worm drive.

Figure 3 is a view on a smaller scale showing the arrangement of Figure 2 in side elevation.

Figure 1:
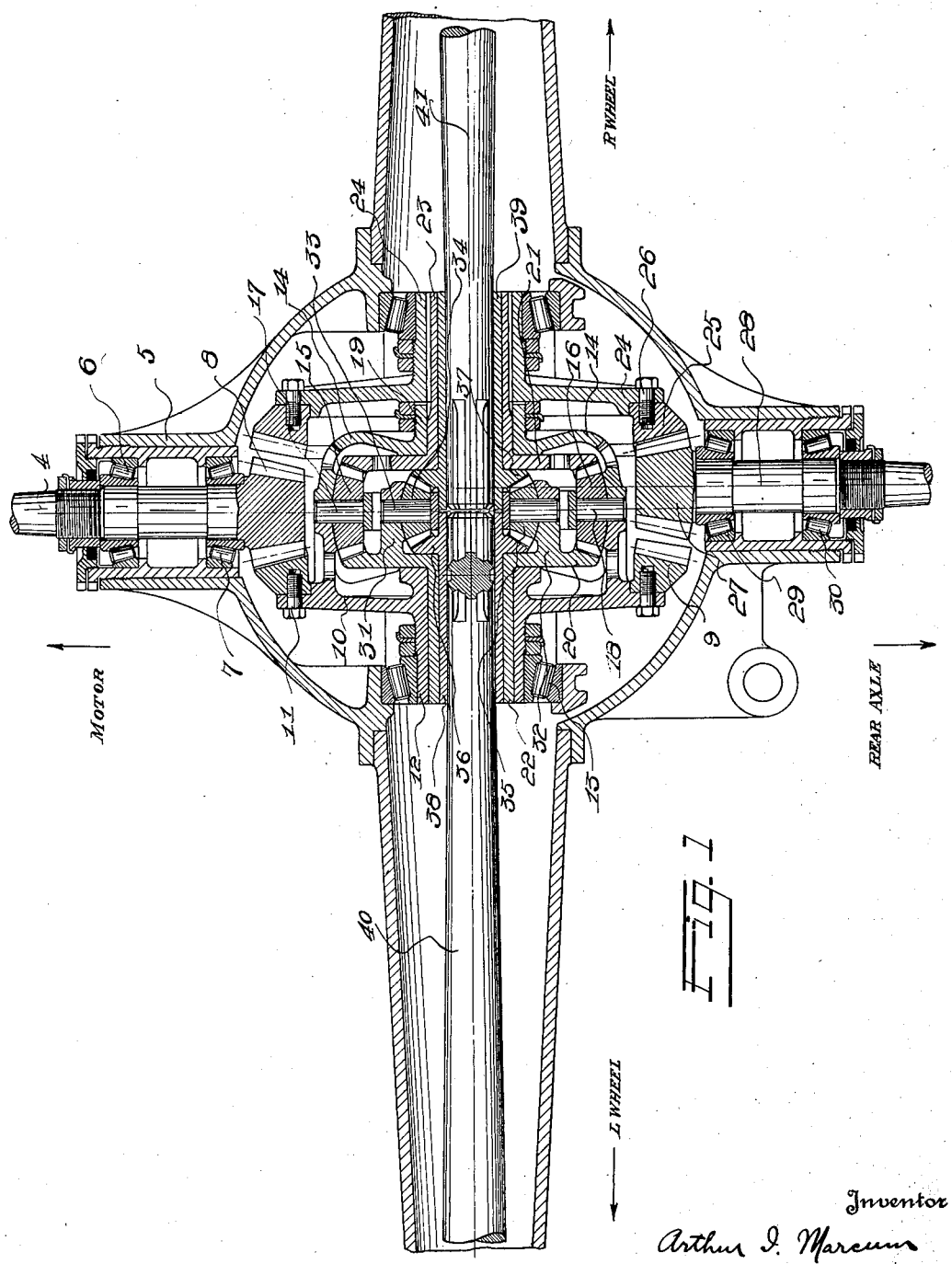

Like reference characters indicate like parts throughout the several figures.

Numeral 4 indicates the drive shaft that is connected to the propeller shaft in any suitable manner. Shaft 4 is rotatably mounted in axle housing 5 by means of roller bearings 6 and 7, and carries a bevel pinion 8 on its outer end.

Pinion 8 meshes with a reducing ring gear 9, that is secured to a member 10 by bolts 11. Member 10 is provided with a cylindrical extension 12 that is journaled in housing 5 by roller bearings 13. Secured to member 10 is a differential member 14 carrying differential gears 15 and 16 rotatably mounted on pins 17 and 18 carried by member 14. Member 14 is provided with a hollow cylindrical extension 19. Meshing with gears 15 and 16 are bevel gears 20 and 21, which are provided with sleeve like extensions 22 and 23 respectively, that are arranged within cylindrical extensions 12 and 19 of members 10 and 14.

Keyed to extension 23 is a member 24 to which is secured a ring gear 25 by bolts 26. Gear 25 meshes with bevel gear 27 carried by an intermediate shaft 28 journaled in housing 5 by roller bearings 29 and 30. Shaft 28 transmits the power of the propeller shaft to the differential gear of the rear axle. It will thus be seen that shaft 28, and accordingly the rear differential, is driven by differential gear 21. Companion differential gear 20 drives the differential of the forward driven axle in a manner presently to be described.

Projecting from gear 20 are perforated lugs 31 and 32 the perforations of which are substantially in alignment with pins 17. Pins 33 carrying bevel gears 34 and 35 are mounted in said perforations. Gears 34 and 35 are arranged between gears 36 and 37, provided with sleeve like extensions 38 and 39 respectively, that are rotatable in extensions 22 and 23 respectively. Shaft section 40 is splined to extension 38, while shaft section 41 is splined to extension 39.

It will be observed that by the construction above described the differential gears 34, 35, 36 and 37 for the shaft sections are in nested relation to differential gears 15, 16 20 and 21 that serve to differentially transmit the power of the drive shaft to the several driven axles, and that the axes of the differential gears just named are the axis of the one driven shaft and the axis of the drive shaft. This provides an extremely compact and practicable arrangement embodying comparatively few parts and in which the construction is kept as low as is practicable.

In Figures 2 and 3 the invention is shown applied to a worm gear drive. As shown in these figures, the drive shaft 42 carries a worm 43 meshing with a ring worm wheel 44. Worm wheel 44 carries differential gears 45 and 46 meshing with gears 47 and 48. Gear 47 serves to drive the differential on the other driven shaft through gear 49, the hub 50 of which is splined to the sleeve like extension 51 of gear 47. Gear 49 meshes with bevel gear 52 on intermediate shaft 53 (see Figure 3). Said shaft drives the differential on the rear driven shaft.

Gear 48 carries differential gears 54 and 55 that are in engagement with gears 56 and 57 splined upon driven shaft sections 58 and 59 respectively. It will be observed that the nested arrangement of differential gears in this form of the invention is substantially the same as that above described in more detail in connection with the preferred form of Figure 1.

The operation of the invention is obvious from the above description of the structure and the function of the parts thereof.

The invention has been above described in considerable detail. However, it should be understood that the invention is not confined to such details but that the scope thereof is to be determined from the following claims.

What I claim as new is:

1. A tandem axle drive including a drive shaft, an intermediate shaft, axle sections, a differential operatively associated with said axle sections, a second differential driven by said drive shaft, and operatively associated with said intermediate shaft, and said first named differential, said differentials being arranged in nested relation.

2. A tandem axle drive comprising a drive shaft, axle sections, an intermediate shaft, a differential operatively connecting said axle sections, a second differential interposed between said drive shaft and said first differential, means connecting said second differential with said intermediate shaft, the power of the drive shaft thereby being transmitted differentially to said intermediate shaft and to said first named differential, said differentials being arranged in nested relation with the gears thereof journaled to turn on axes coincident with the axle axis or in a plane at right angles to said axis.

3. A tandem axle drive including two differentials one arranged within the other to swing about a common axis, a drive axle comprising two sections, one of said differentials being operatively connected to the sections of said drive axle, and the other being arranged to differentially drive said last mentioned differential and a third differential forming a part of the other drive axle.

4. In a vehicle drive construction, a housing, a drive shaft, driven axle sections and an intermediate shaft journaled in said housing, two separate differential mechanisms arranged in said housing with their axes of rotation substantially coincident to the axis of the axle sections, one of said mechanisms being driven by said drive shaft and in driving engagement with the other, one of said mechanisms being operatively connected to said axle sections, and means operatively connecting said intermediate shaft with one of said mechanisms.

5. The combination set forth in claim 4 in which the intermediate gears of the two differentials are journaled to rotate on separate axes that are located in a plane containing the axis of the drive shaft.

6. A tandem axle drive construction including a housing, a worm journaled in said housing, a worm differential ring journaled in said housing, differential mechanism carried by said ring, a second differential mechanism arranged substantially within said ring and in operative engagement with said first mechanism, axle sections and an intermediate shaft journaled in said housing, means connecting one of said mechanisms with the axle sections, and means connecting the other of said mechanisms with said intermediate shaft, said sections and said shaft thereby being differentially driven.

7. A tandem axle drive construction including a drive shaft, an intermediate shaft and axle sections, a differential between said axle sections, a second differential between said first named differential and said intermediate shaft, said second differential surrounding said first named differential in driving engagement therewith and rotating about the same axis, the axes of said shafts, sections and differentials being in the same horizontal plane.

8. A drive for tandem axle vehicles comprising a housing for one of the axles, a drive shaft and an intermediate shaft journaled in said housing, axle sections in said housing, a differential uniting said axle sections for unitary or differential rotation, a second differential surrounding said first named differential and designed to rotate about the same axis, said second differential being arranged to differentially drive said intermediate shaft and said first named differential, and gearing between said drive shaft and second differential.

9. A drive for a vehicle including two drive axles each supported by a pair of wheels, an axle section secured to each wheel, a differential for the axle sections of each axle, and a third differential arranged in nested relation to one of said first named differentials for rotation about an axis common to the nested differentials, and means operatively connecting said third differential to each of said first named differentials.

10. A drive for a multi-wheel vehicle including a propeller shaft, an intermediate shaft, a drive axle including axle sections and a differential for said axle sections, a second differential arranged around said first named differential, means operatively connecting said second differential and said propeller shaft, and means operatively connecting said second differential to said intermediate shaft and to said first named differential.

In testimony whereof I affix my signature.

ARTHUR I. MARCUM.